UNITED STATES PATENT OFFICE.

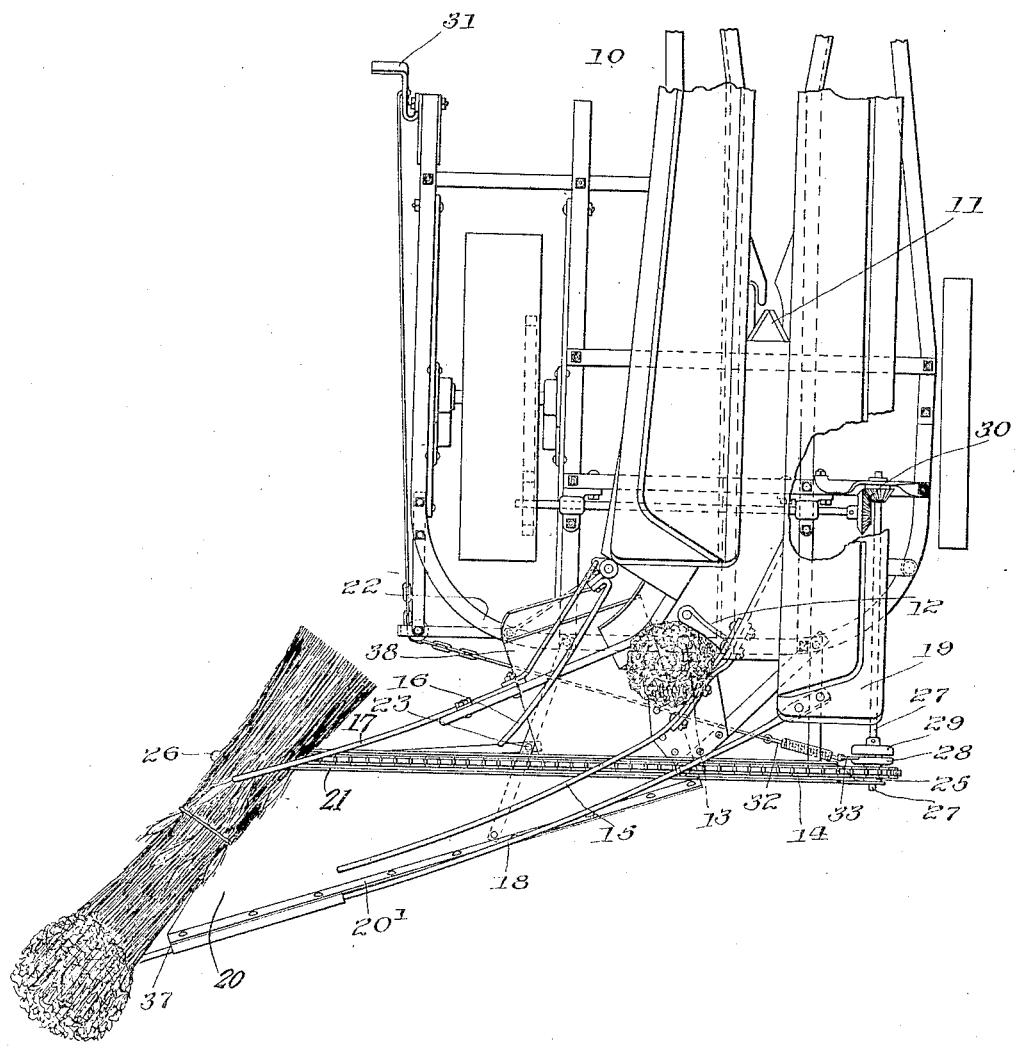

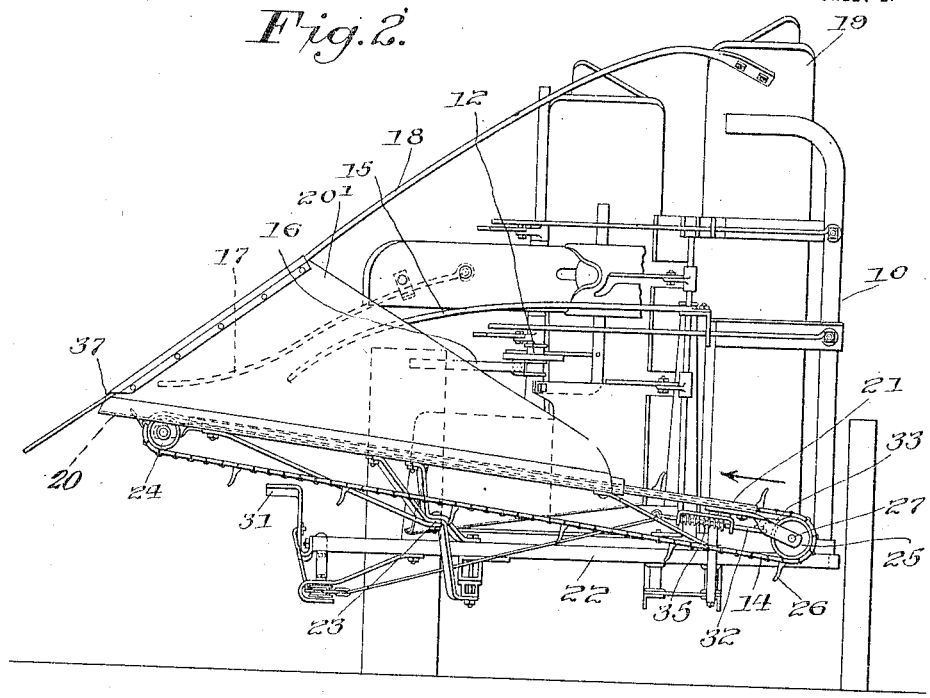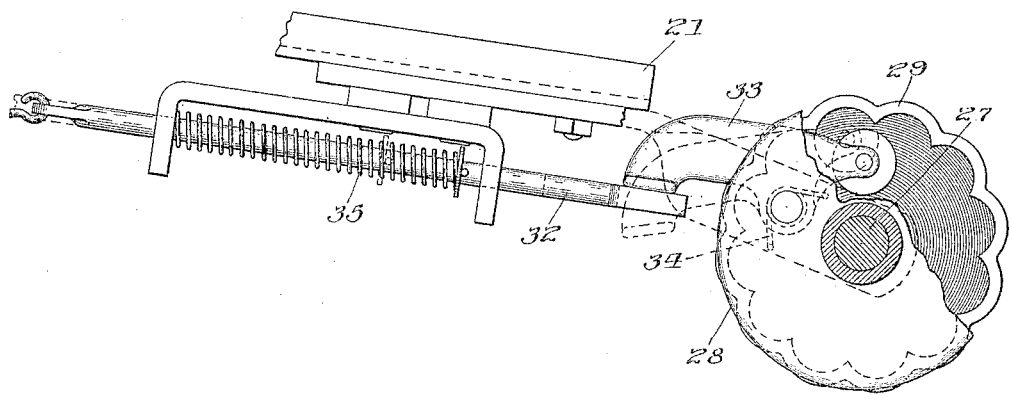

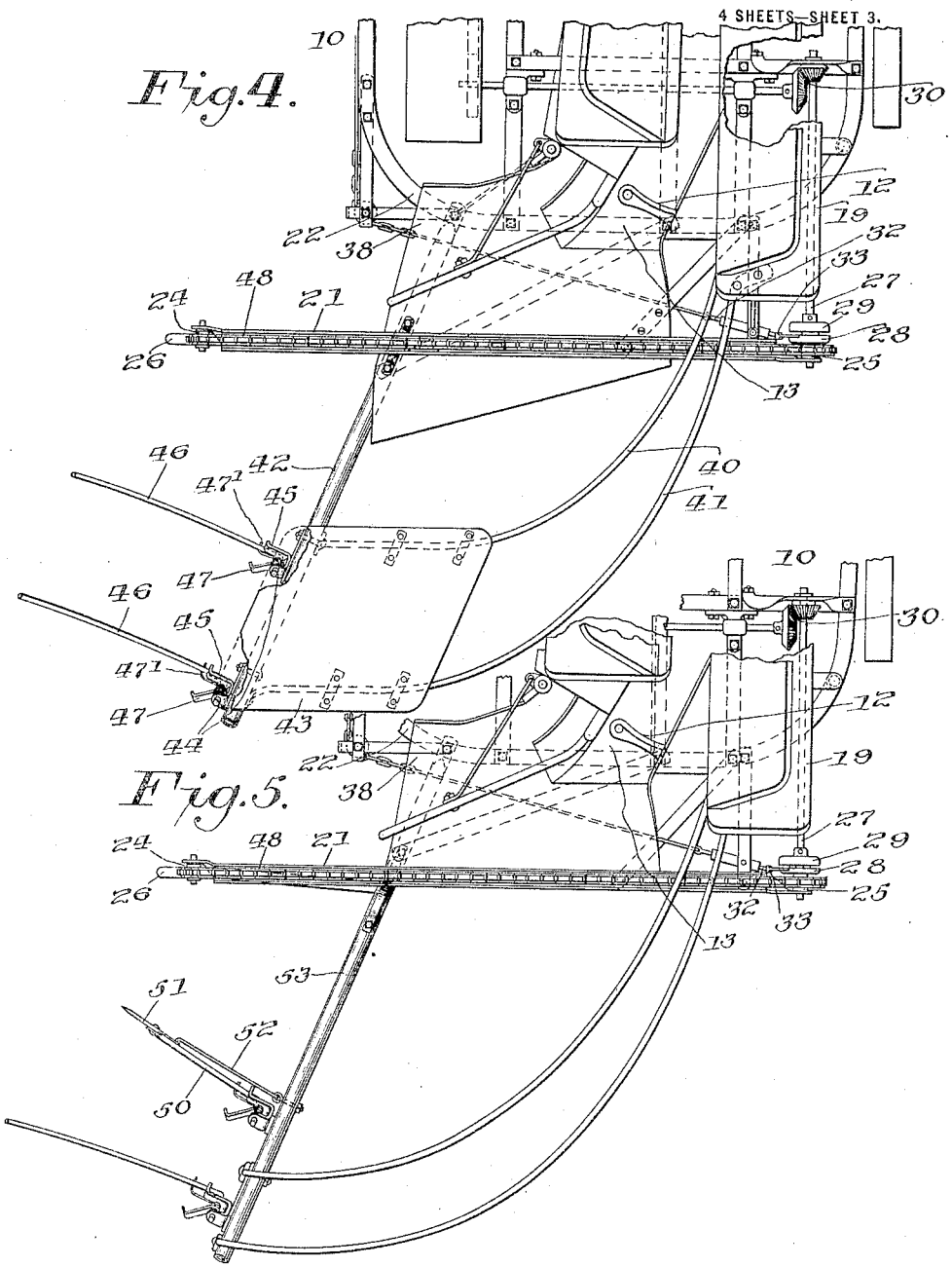

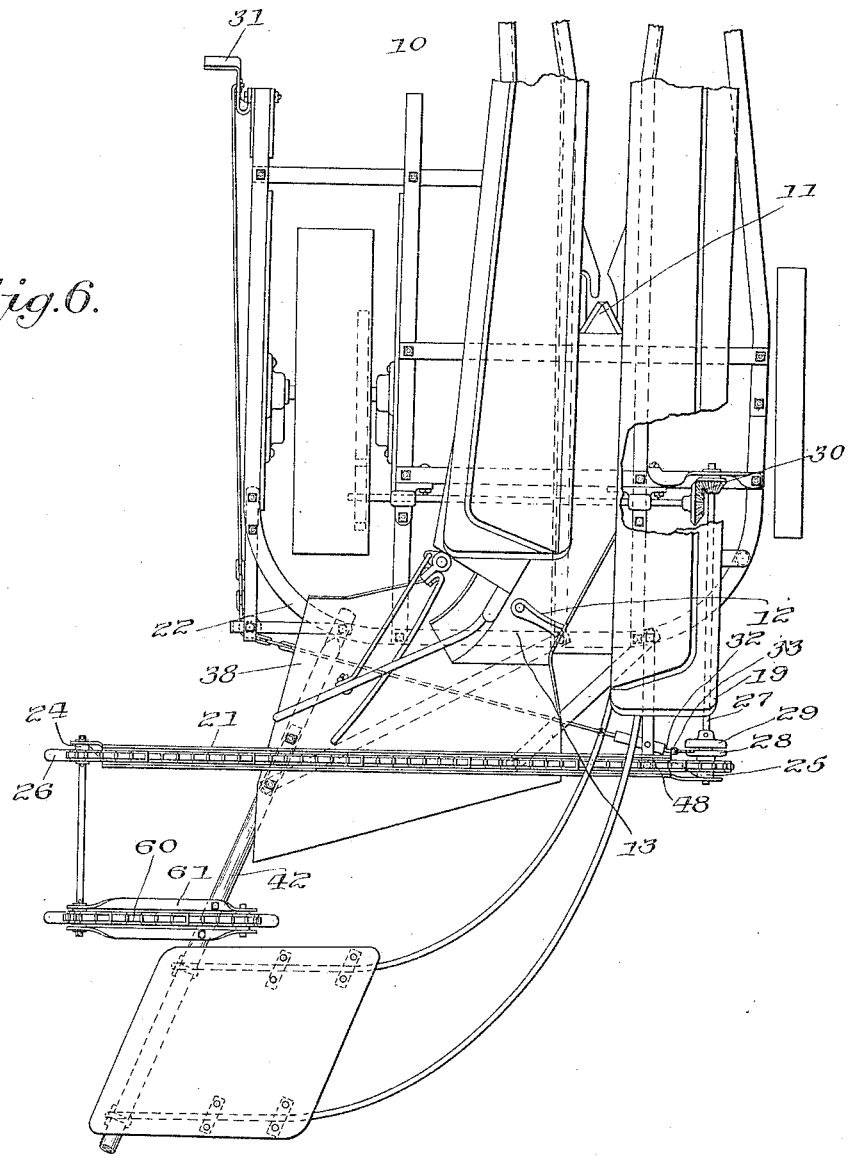

CLEMMA R. RANEY, OF CHICAGO, ILLINOIS, ASSIGNOR, BY MESNE ASSIGNMENTS, TO INTERNATIONAL HARVESTER COMPANY, A CORPORATION OF NEW JERSEY.

HARVESTER.

1,319,488.  Specification of Letters Patent.  Patented Oct. 21, 1919.

Application filed March 22, 1915. Serial No. 16,141.

*To all whom it may concern:*

Be it known that I, CLEMMA R. RANEY, a citizen of the United States, residing at Chicago, in the county of Cook and State of Illinois, have invented certain new and useful Improvements in Harvesters, of which the following is a full, clear, and exact specification.

This invention relates to harvesters, such, for example, as corn harvesters, and more particularly to bundle delivering mechanism therefor.

In the operation of corn harvesters built thus far, it has been noted in many instances that bundles of corn, which have been properly formed and bound in such machines, have not been delivered or discharged from the harvester to the ground in the most satisfactory manner, at least from a protective standpoint; that is to say, that bundles of corn are not always discharged from a corn harvester in a manner to place them beyond the path of travel of one of the draft horses, such as the third horse. If the bundles are not discharged far enough to one side of the machine, the third horse, upon the second round of the machine, and all rounds thereafter, will be forced to step over such bundles. But in attempting so to do, it is found that the horse does considerable damage to the bundles and knocks off ears of corn.

Therefore, it is the main object of my invention to prevent injury to discharged bundles of corn or other grain by a draft animal or other source of power while drawing the harvester during the operative movements thereof.

Another object is to discharge or deliver such bundles from the harvester in an improved manner to cause the bundles to be placed beyond the path of movement of a draft animal or other source of power while drawing the harvester.

Another object is to provide a harvester with bundle delivering mechanism adapted to meet all of the requirements for successful commercial operation.

These and other objects are accomplished by providing, in a harvester, mechanism for receiving bundles from the binding mechanism, conveying said bundles laterally of the machine, giving said bundles a pivotal movement and causing them to take a rolling motion to a point a considerable distance from the machine, and causing said bundles to take positions on the ground such that their lengths will be substantially parallel to the line of draft.

The invention is illustrated on the accompanying sheets of drawings, in which—

Figure 1 is a plan view of a harvester embodying my invention;

Fig. 2 is a rear elevation of the same harvester, showing my improved bundle delivering mechanism;

Fig. 3 is a detail view showing the clutch mechanism for connecting and disconnecting parts of the source of power and conveyer chain of the bundle delivering mechanism;

Fig. 4 is a fragmentary plan view of a harvester embodying a modification of my delivering mechanism;

Fig. 5 is a plan view of another modification of my bundle delivering mechanism; and Fig. 6 shows a plan view of a third modification of my bundle delivering mechanism.

The various novel features of my invention will be apparent from the following description and drawings, and will be particularly set forth in the appended claims.

Harvesting machines of numerous descriptions have been provided with various forms and types of bundle delivering mechanism, but with all these different types of bundle delivering mechanisms more or less trouble has been encountered, not because the bundles were not delivered to the ground in an efficient manner, but mainly because these bundles were placed crosswise directly in the path of travel of one of the horses; namely, the third horse, while drawing the harvester. Bundles thrown in the path of travel of the third horse forced the horse to step over the bundles. In so doing the horse almost invariably injured the bundles and knocked off ears of corn. This, of course, is not only unsatisfactory, but is inconsistent with approved methods of farming.

To overcome this objectionable feature I have provided, in a harvester, bundle delivering mechanism which receives the bundles from the binding mechanism and discharges said bundles at a relatively great distance laterally of the machine in a manner to place the bundles beyond the path of travel of all of the draft animals.

I have illustrated my invention particularly in connection with a corn harvester 10, having the usual cutting mechanism 11 and binding mechanism 12, by means of which the stalks of corn are bound into bundles while standing in a vertical position upon the usual butts chute 13. When the bundles are discharged from the binding mechanism by means of the usual discharge arms they fall prostrate upon and transversely across a conveyer chain 14 forming a part of my improved bundle delivering mechanism. The bundles in falling are guided by the oppositely arranged rods 15, 16, 17 and 18, the latter rod 18 being supported by the grainward gathering board 19, and extending rearwardly and downwardly and stubblewardly. The heads of the bundles slide over this rod 18. Secured to this rod 18 is the upwardly extending portion $20^1$ of an apron 20 formed preferably of sheet metal, said apron 20 forming part of the laterally extending stationary conveyer frame, or bundle delivering means. A channel member 21, also forming a part of the stationary member of the bundle delivering means, is supported from the rear frame member 22 of the harvester through a suitable system of braces 23. This stationary part of the bundle delivering means also supports two sprocket wheels 24 and 25, over which passes the conveyer chain 14, which has suitable teeth 26 for engaging the bundles at substantially the portion where the bundles are bound. The sprocket wheel 25 is mounted upon a shaft 27, upon which also is mounted a loose clutch member 28 operatively connected to sprocket wheel 25 and adapted to rotate, under certain conditions, with a clutch member 29 fixed to this auxiliary shaft 27, which receives its power from any suitable source through intermeshing gears 30. The clutch is controlled by the operator through a foot control lever 31, which is connected to a spring-pressed latch 32, which normally lies in the path of movement of a pawl 33 mounted upon the clutch member 28. As shown in Fig. 3, the clutch members 28 and 29 are disconnected, the latch 32 holding the pawl 33 out of engagement with the clutch member 29 against the action of a spring 34. When it is desired to transmit motion to the conveyer chain 14 for delivering bundles to the ground, the same may be accomplished by actuating the easily movable foot control lever 31, thus withdrawing the latch 32 and permitting the spring 34 to connect the clutch members 28 and 29, whereupon the conveyer chain 14 will be actuated from the source of power in the direction of the arrow shown in Fig. 2 for the purpose mentioned. When the clutch lever 31 is released, a spring 35 returns the latch 32 back into the path of movement of the pawl 33, whereupon the pawl 33 engages the latch 32 during its rotative movement, causing the clutch members 28 and 29 to be disconnected, thereby preventing further motion being transmitted to the conveyer chain 14.

Let it be assumed that a bundle of corn has been formed and bound in a vertical position by the usual binding mechanism and discharged therefrom by the usual discharge arm. As stated above, the bundle falls prostrate upon the bundle delivering mechanism, being guided in its falling movement by the rods 15, 16, 17 and 18, the head of the bundle being guided and supported by the latter rod 18. Being discharged from the binding mechanism in this manner, the bundle falls across the movable member or conveyer chain 14 at an angle thereto and at an angle with respect to the line of draft of the harvester. For the reasons given above, it is particularly desirable that the bundles, when delivered to the ground, should lie with their length substantially in a line parallel to the line of draft and at a considerable distance to the side of the machine so that on the next round the third horse will find its path of travel free from bundles.

The primary function of the conveyer chain 14 is to grip the bundles and feed them stubblewardly and transversely with respect to the machine in a manner to give the butt ends of the bundles a relative pivotal or swing movement with respect to the heads of the bundles to cause the length of the bundles to approach a parallel position with respect to the line of draft. Reference being had first to Fig. 1, it will be seen that the head of the bundle will take a position at the rear and stubbleward end of the conveyer apron 20 and rod 18 at a point such as 37, and remain relatively stationary, while the butt end of the bundle is swung around by the conveyer chain 14 with the head of the bundle acting as a pivot. When the butt end of the bundle has reached the extreme stubbleward end of the bundle discharging mechanism, with the butt end of the bundle near the stubbleward sprocket wheel 24, the bundle is forcibly discharged from the delivering mechanism in a manner such that when the head strikes the ground it remains substantially stationary while the butt end will continue to swing about the head of the bundle as a pivot due to its momentum obtained through the actuation of the conveyer chain 14. The butt end of the bundle lies forward. In this manner a bundle, which is discharged from the binding mechanism and falls prostrate across the conveyer chain 14, is gradually pivoted about its head through the action of the conveyer chain to cause the length of the bundle to approach a line parallel with the line of draft, the head of the bundle remaining practically stationary when it reaches the backward and stubbleward end of the bundle carrier, the bundle then being discharged or delivered from the carrier in a manner such that when the head of the bundle strikes the ground it remains stationary while the butt end of the bundle is given a further pivotal movement about its head to cause the bundle to assume such a position that its length is substantially parallel with the line of draft and out of the path of travel of the draft animals or other source of motive power. When I speak of the path of travel of the third horse, I mean a path which corresponds substantially with the second row of stubble from the row of corn being cut. So, to place the bundles beyond the path of movement of the third horse, it is necessary to place them at least beyond the second row of stubble from the row of corn being cut.

The bundle carrying apron 20 extends from the butts chute 13 rearwardly and stubblewardly beyond the stubbleward end of the conveyer chain 14 and almost to the end of the rod 18. Adjacent the butts chute 13, and between the butts chute and the conveyer chain 14 proper, is a trash chute 38 which extends stubblewardly and slopes downwardly from the butts chute. By means of this trash chute all trash from the binding mechanism may be conveyed directly to the ground without passing over the conveyer chain 14 and apron 20 of the bundle delivering mechanism.

In Fig. 4 of the drawings, I have shown one modification of my invention, in which two rods 40 and 41 extend from the grainward gathering board to the rear end of a frame member 42, which is secured to the rear frame member of the harvester and which extends rearwardly and stubblewardly, forming the main support for the bundle carrier. Supported by the arms 40 and 41 and the frame member 42 is a relatively small apron 43 for supporting the heads of the bundles. Secured to the frame member 42 are two bracket members, each of which includes spaced side members 44 and 45, the latter side member forming a stop member for limiting forward movements of tines 46, which are journaled in the side members 44 and 45, the rearward movement of said tines being limited by stop members 47 formed integrally with the bracket members. The tines 46 are normally held in their raised position, as shown in Fig. 4, by suitable springs 47¹, the main function of the tines 46 being to hold the heads of the bundles as the butt ends thereof are swung around by the conveyer chain 48. The heads of the bundles gradually move outwardly on the tines 46, and when the butt ends of the bundles have reached the stubbleward end of the conveyer chain 48 the weight of the heads of the bundles causes the tines to swing about their pivotal points rearwardly and downwardly to permit the bundles to be delivered to the ground. As mentioned in connection with the arrangement disclosed in Figs. 1 and 2, the bundles are delivered into a position such that their lengths are substantially parallel with the line of draft of the harvester and lie outside of the path of travel of the draft animals. This modification disclosed in Fig. 4 differs primarily from that shown in Figs. 1 and 2 by having the spring-pressed pivotally mounted tines 46 for yieldingly holding the heads of the bundles as the butt ends are swung around, which is not the case with the arrangement disclosed in Figs. 1 and 2. It will be noted also that, by means of the pivotal arrangement of the tines 46, the heads will be guided laterally in their downward movement over the tines.

The modification disclosed in Fig. 5 is based upon the one disclosed in Fig. 4. It will be noted, however, in Fig. 5 that at the end of one of the tines 50 is pivotally secured a finger 51, one end of which is connected by a link 52 to the frame member 53. Normally this finger 51 extends substantially vertically in a manner to positively hold the heads of the bundles while the butt ends are swung about the heads as a pivot by the conveyer chain. However, as the tines swing rearwardly and downwardly under the weight of the heads, the pivotally mounted finger 51 gradually moves into alinement with the tine 50, due to its link connection with the rod 53, thereby permitting the heads of the bundles to drop at the proper time.

The modification disclosed in Fig. 6 is similar to the one shown in Fig. 4, the difference being that the tines 46 are removed and a second conveyer chain 60 is provided, which is mounted in a bracket 61 secured to the frame member 42. The chain 60 is preferably actuated at a slower speed than the main conveyer chain 48, which assists materially in causing the butt ends of the bundles to be swung around the heads thereof as a pivot for delivering the bundles to the ground in a manner such that their lengths will be substantially parallel with the line of draft of the machine.

In all of these arrangements several bundles may be deposited upon the bundle delivering mechanism before the clutch is thrown in to cause the actuation of the conveyer chains. In this manner the bundles may be deposited in interrupted windrows lying parallel with the line of draft.

It is evident that there may be various modifications other than those here particularly shown and described, and it is my intention to cover all such modifications which do not involve a departure from the spirit and scope of my invention.

What I claim as my invention, and desire to secure by Letters Patent, is:

1. In a harvester, bundle delivering means including a stationary member disposed in a substantially horizontal plane and a movable member operable across said stationary member for causing a bundle to pivot about one of its ends as the bundle passes over the stationary member.

2. In a harvester, bundle delivering means including a stationary member disposed in a substantially horizontal plane and a movable member operable across said stationary member for causing the bundle to pivot about its head as the bundle passes over the stationary member.

3. In a harvester, bundle delivering means including a stationary member disposed in a substantially horizontal plane and a movable member operable across said stationary member for causing the butt end of a bundle to be pivoted about the head of the bundle as the head remains substantially stationary at one point of said stationary member.

4. In a harvester, binding mechanism, and bundle delivering means associated therewith including a laterally extending substantially horizontal stationary member and a movable conveyer member for receiving a bundle from said binding mechanism in prostrate position and for causing the butt end of the bundle to swing about its head in a substantially horizontal plane as it is passed over said stationary member for causing the length of the bundle to take a position on the ground substantially parallel to the line of draft.

5. In a harvester, binding mechanism, and bundle delivering means associated therewith including a substantially horizontal stationary laterally extending member and a chain passing over said stationary member for angularly receiving bundles discharged from said binding mechanism, said chain giving the butt end of the bundle a swinging movement in a substantially horizontal plane as the head remains substantially stationary on said stationary member causing the length of the bundle to assume a line parallel to the line of draft.

6. In a harvester, binding mechanism, a butt chute, endless bundle delivering means for conveying the bundles laterally, and a downwardly inclined chute intermediate the binding mechanism and said delivering means for supporting the bundles prior to the engagement therewith of said delivering means and for discharging trash from the machine.

7. In a harvester, bundle delivering means including a stationary member, an intermittently operable member movable across said stationary member, said movable member being operable to swing a bundle laterally as it passes over said stationary member and means for controlling the intermittent operation of said member during the operation of said harvester.

8. In a harvester, bundle delivering means including a stationary member, a movable member operable across said stationary member, said movable member being operable to engage a portion of the bundle and swing said bundle laterally as it passes over said stationary member, and means for engaging another portion of said bundle to retard said portion as it is moved across said stationary member.

9. In a harvester, bundle delivering means including a substantially horizontal stationary member and a movable member operable across said stationary member for swinging a bundle laterally as it passes over said stationary member, means for driving said movable member, and means for controlling the driving of said movable member.

10. In a harvester, bundle delivering means including a stationary member and a movable member, the latter for swinging one portion of a bundle, and means for holding another portion of the bundle on said stationary member.

11. In a harvester, bundle delivering means including a stationary member and a movable member for swinging one portion of a bundle, and yielding means for holding another portion of the bundle on said stationary member.

12. In a harvester, bundle delivering means including a stationary member and a movable member for swinging one portion of the bundle, and pivotally mounted means for holding another portion of the bundle on said stationary member.

13. In a harvester, bundle delivering means including a stationary member and a movable member for engaging and swinging the butt end of a bundle relative to the head of the bundle as a pivot, and means for positively holding the head of the bundle on said stationary member as the butt end is swung.

14. In a harvester, bundle delivering means including a stationary member and a movable member for swinging one end of a bundle relative to the other end, and tines for holding said other end of the bundle stationary as said movable member swings the first end of the bundle.

15. In a harvester, bundle delivering means including a stationary member and a movable member for swinging one end of the bundle relative to the other end, and spring-pressed pivotally mounted tines for holding said other end of the bundle stationary as said movable member swings the bundle.

16. In a harvester, bundle delivering means including a member for positively holding one end of a bundle stationary and another member for swinging the other end of said bundle as the first end is held stationary, said holding means gradually being overcome by the action of said swinging member to permit the bundle to be discharged to the ground.

17. In a harvester, bundle delivering means including a tine having a pivotally mounted finger for positively holding one end of a bundle against movement, a movable member for causing the other end of the bundle to swing about the stationary end of the bundle, said tine and finger gradually yielding under the influence of the weight of said bundle and the actuation of said movable member.

In testimony whereof I affix my signature.

CLEMMA R. RANEY.

Copies of this patent may be obtained for five cents each, by addressing the "Commissioner of Patents, Washington, D. C."